Sept. 25, 1962 W. D. MACGEORGE 3,055,224
ANTI-BACKLASH CROSSHEAD POSITIONING MEANS
Filed Jan. 15, 1960 3 Sheets-Sheet 1

INVENTOR.
William D. Macgeorge
BY
Wm. R. Glisson
ATTORNEY

Sept. 25, 1962 W. D. MACGEORGE 3,055,224
ANTI-BACKLASH CROSSHEAD POSITIONING MEANS
Filed Jan. 15, 1960 3 Sheets-Sheet 2

INVENTOR.
William D. Macgeorge
BY
Wm. R. Gleason
ATTORNEY

Sept. 25, 1962

W. D. MACGEORGE 3,055,224

ANTI-BACKLASH CROSSHEAD POSITIONING MEANS

Filed Jan. 15, 1960

3 Sheets-Sheet 3

INVENTOR.
William D. Macgeorge
BY
Wm. R. Glisson
ATTORNEY

United States Patent Office 3,055,224
Patented Sept. 25, 1962

3,055,224
ANTI-BACKLASH CROSSHEAD POSITIONING MEANS
William D. Macgeorge, Berwyn, Pa., assignor to The Budd Company, Philadelphia, Pa., a corporation of Pennsylvania
Filed Jan. 15, 1960, Ser. No. 2,682
13 Claims. (Cl. 74—89)

This invention relates to anti-backlash crosshead positioning means as for a testing machine, and has for an object the provision of improvements in this art.

One of the particular objects of the invention is to provide a common drive for the traversing nuts and the locknuts of a crosshead to turn them all together while the crosshead is being traversed along the load screw columns.

Another object is to provide a differential gear unit between the drive for the traversing nuts and the drive for the locknuts whereby all nuts can be driven in unison by a single power drive device and whereby the locknuts alone are turned when the traversing nut drive is locked in position.

Another object is to provide means for assuring that the locknuts are fully unlocked and clear before the traversing nuts can be turned.

Another object is to provide separate motors for turning the traversing and locknuts, together with means to assure that both motors are not driven simultaneously.

Another object is to provide a differential between a traversing nut shaft and a locknut shaft, together with a traversing motor which drives both shafts and a locking motor which turns only the locknut shaft when the traversing nut shaft is stopped.

Another object is to provide equalized locking for two locknuts to assure that both are fully tightened even if there are local variations in the threads of the two load screws.

Figure 1:
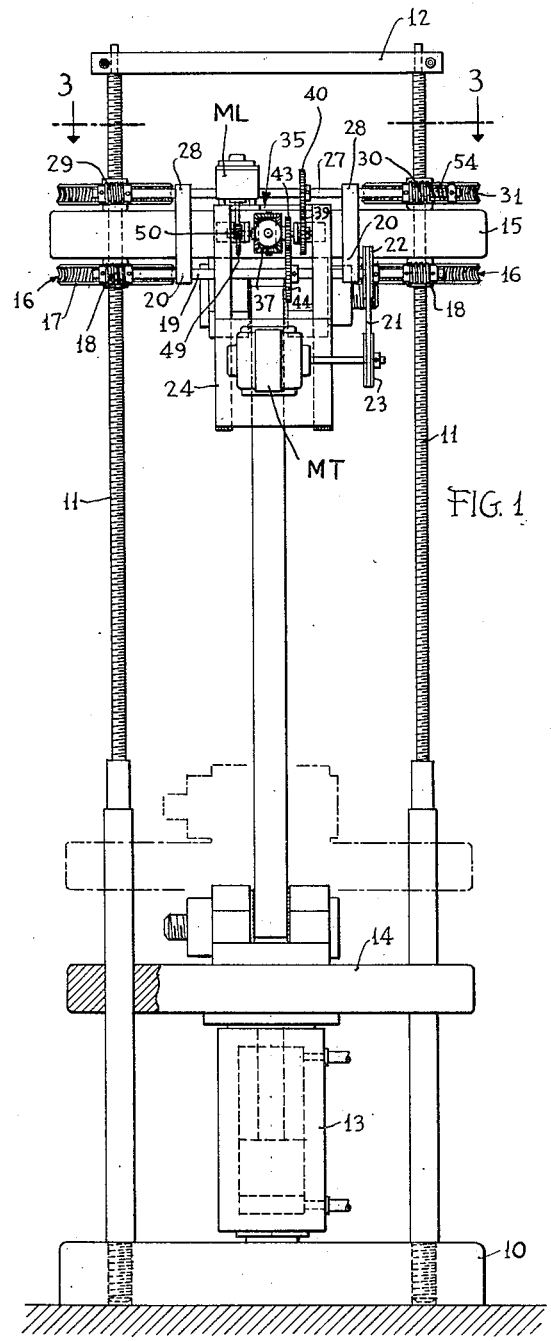
Figure 2:
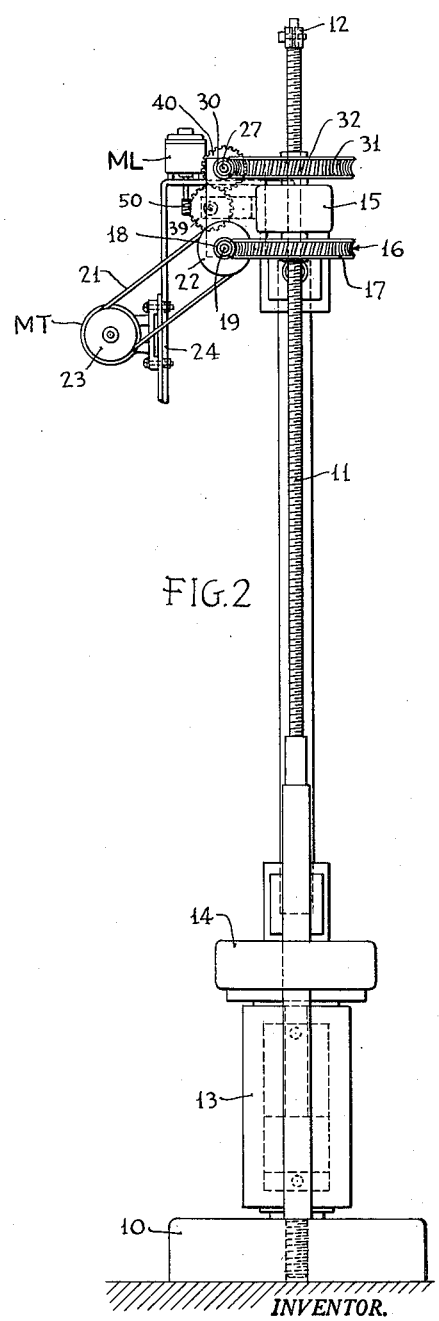
Figure 3:
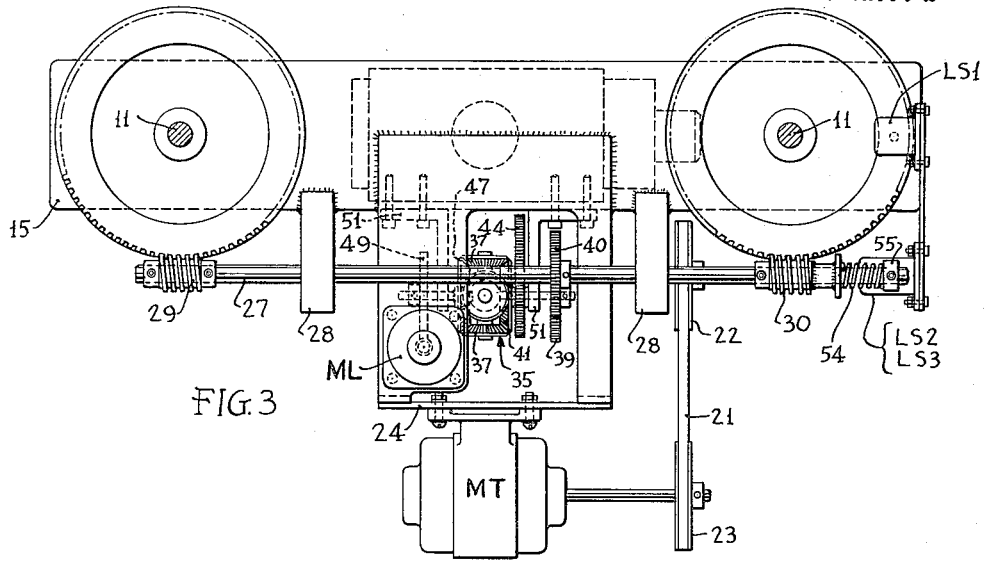
Figure 4:
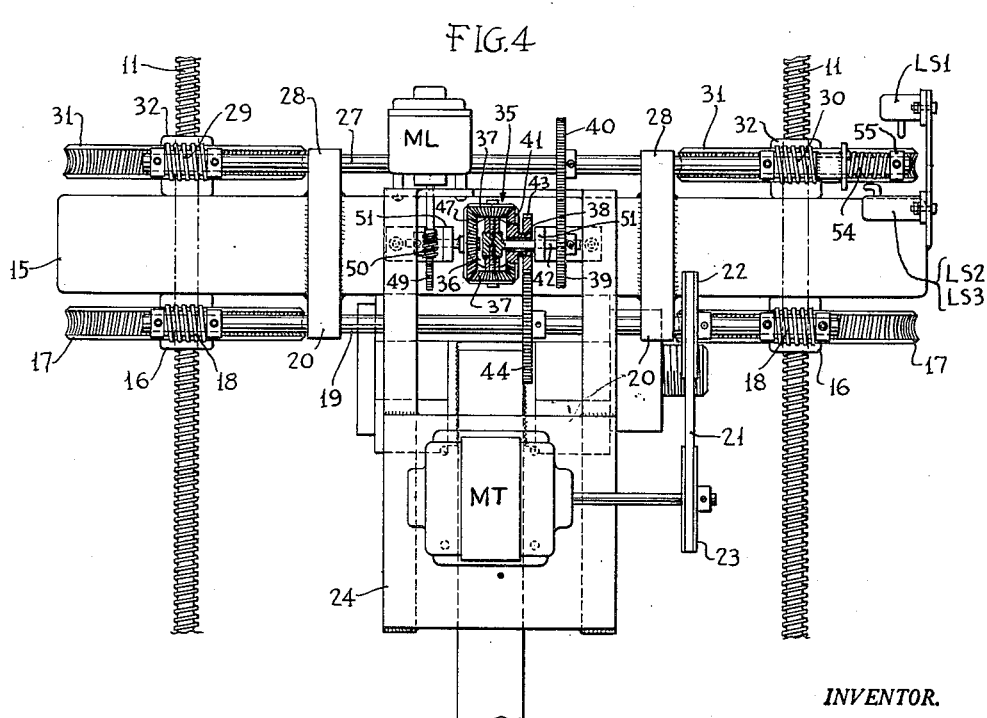
Figure 5:
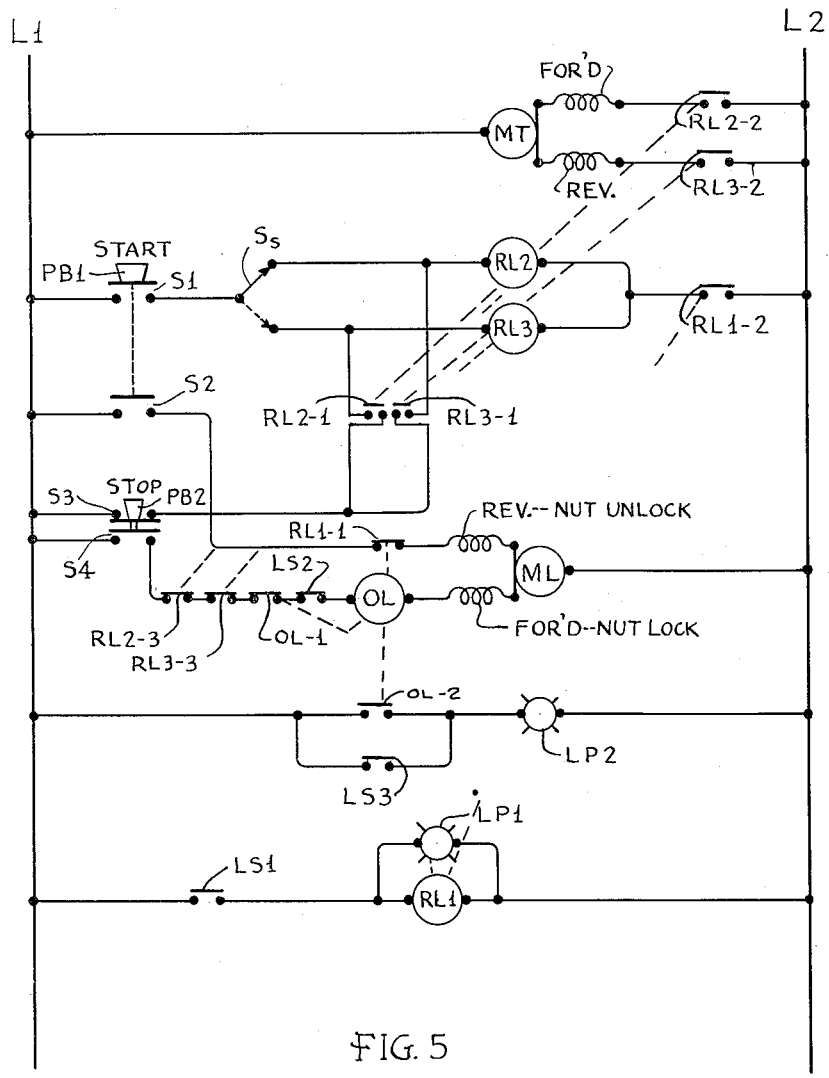

The above and other objects and various features and advantages of the invention will be apparent from the following description of an illustrative embodiment, reference being made to the accompanying drawings, wherein:

FIG. 1 is a rear elevation of a testing machine embodying the invention;
FIG. 2 is a side elevation of the parts shown in FIG. 1;
FIG. 3 is an enlarged top plan view of the crosshead;
FIG. 4 is an enlarged rear elevation of the crosshead; and
FIG. 5 is a wiring diagram.

As shown in the drawings, a base 10 supports a pair of load screw colums or shafts 11 connected at the top by a cap or head 12. The base also carries a power device 13 and table 14 for imposing a load on a specimen. The table may carry grips for tension testing when desired. A traversing load crosshead 15 is carried by the load screw columns or shafts 11, being supported on traversing nuts 16 threaded on the load screw columns.

The traversing nuts 16 are provided peripherally with worm gears 17 driven by worm pinions 18 fast on a transverse traversing shaft 19 carried in bearings 20 secured to the crosshead. The shaft 19 is driven by a traversing motor MT through any suitable drive such as a V-belt 21 and belt pulleys 22, 23, the motor being mounted on brackets 24 carried by the crosshead. It is to be understood that a motor unit with a self-contained solenoid-release spring-engaged brake, which is a standard item, is preferred so the crosshead will be accurately stopped where desired.

If the machine should be of a type having screw columns turning in fixed traversing nuts in the crosshead the positioning means described herein would operate in the same way, only simple gearing changes being needed.

A locknut drive shaft 27 is mounted in bearings 28 carried by the crosshead and is provided with worm pinions 29 and 30 meshing with peripheral worm gears 31 on locknuts 32 which are threaded on the load screw columns 11 above the traversing nuts 16 in position to lock the crosshead thereagainst.

Means are provided for driving the locknuts selectively with and in the same direction as the traversing nuts at all times when the latter are being turned and to turn the locknuts to tighten or loosen them during a time when the traversing nuts are held against turning. The means herein shown comprises a differential gear unit 35 having the usual three drive shaft elements, as in an automobile drive differential, for example.

There is a planetary gear mounting 36, carrying the planetary bevel pinions 37, which is secured to a sleeve shaft 38 carrying a gear 39 which drives the locknut drive shaft 27 through a gear 40 secured on the latter shaft. One bevel gear 41, which meshes with the planetary pinions, is rigidly secured on a drive shaft 42 carrying a gear 43 fast thereon, the gear 43 being driven by the traversing shaft 19 through a gear 44 fast on the latter shaft. The other bevel gear 47, which meshes with the planetary pinions, is rigidly secured on a drive shaft 48 carrying a worm gear 49 fast thereon, the gear 49 being driven by a locking shaft drive motor ML through a worm pinion 50 fast on the shaft of the motor. The worm pinion and gear provide an anti-back-drive arrangement. Bearing brackets 51 are provided for supporting the differential gear assembly.

One of the worm pinions on the lock shaft 27, here the pinion 30, is mounted for sliding movement along the shaft so it can move or crawl over its driven worm gear without turning it after it has been tightened while the lock shaft and the other worm pinion 29 continue to turn until the other locknut has been tightened. By prearrangement, the locknut at the sliding pinion tightens before the other locknut tightens. The worm pinion 30 moves against a spring 54 on the shaft, the spring acting against a collar 55 secured to the shaft.

Means are provided for reversing the direction of drive of each the traversing nuts and the locknuts and, conveniently, this is done by reversing the drive direction of the motors, the motors being of a type having reversing field coils. Reversing gear units with suitable controls, could of course, be used but reversing motors can be more easily explained in connection with the wiring diagram.

Here (FIG. 5) current is supplied by line conductors L1, L2. The traversing motor MT has its reversing field coils each respectively in series with one of two switches RL2–2 and RL3–2 of lock-in relays RL2 and RL3. It can be assumed that relay RL2 is for forward or crosshead raising drive and RL3 is for reverse or crosshead lowering drive. The traversing motor control relays RL2 and RL3 are both in series with a starting switch S1, operated by a start push button PB1, and a control switch RL1–2 of a relay RL1. A selector switch Ss is provided in series with the starting switch S1 and selectively in series with relays RL2 or RL3 to control the direction of crosshead movement, up or down respectively.

Run control relay RL1 is in series with a limit switch LS1 which is closed when the locknut 32 is backed off (up) a predetermined distance necessary to assure that the crosshead has been released. A signal lamp LP1 is in shunt with the run relay RL1 to indicate to the operator when the traversing motor is permitted to start.

The locknuts 32 are operated by the motor ML and the motor is started into operation by a switch S2 when the start push button PB1 is held down. The switch S2 is in series with the field coil of motor ML which causes it to run in a reverse direction to back off the locknuts.

When relay RL1 is energized, by the back-off of the locknut and the closing of limit switch LS1, it opens a switch RL1–1 in series with the switch S2 and stops the locknut operating motor ML. At the same time RL1 closes the run switch RL1–2 to cause the traversing motor MT to operate, the push button PB1 still being held down.

Means are provided for locking in the relays RL2 and RL3—whichever one has been selected by switch Ss—so the traversing motor MT will continue to operate after the start push button PB1 has been released, after lamp LP1 has been lighted to indicate that the locknuts have been backed off. The means provided comprises lock-in relay switches RL2–1 and RL3–1 which are arranged in shunt with each other to their respective actuating relay coils RL2 and RL3 and in series with a normally closed stop switch S3 of a stop push button PB2.

Means are provided for causing the locknut locking motor ML to operate to turn the locknuts in a locking direction after and only after, the traversing motor MT has stopped and for stopping the locking motor when the locknuts have been tightened. Stopping is controlled by an overload relay and, for safety, also by a limit switch in case of failure of the overload relay. These means, as here shown, include, in series with the forward or locking field coil of the motor ML, relay switches RL2–3 and RL3–3, of relays RL2 and RL3, which are normally closed but one of which is opened when either relay is energized, thus assuring that the locking motor cannot be energized until the traversing motor has stopped. If the line is otherwise closed, that is if a manual start switch S4 which is operated when the stop pushbutton PB2 for the traversing motor MT is not provided, the closing of the switches RL2–3 and RL3–3 will automatically start the locknut motor when the traversing motor stops.

If the stop pushbutton PB2 and the lock-in switches RL2–1 and RL3–1 were not provided, or if the stop push button PB2 were latched down, the entire operation could be made automatic and dependent upon the operator holding down the start pushbutton PB1 throughout the entire traversing movement.

Also in series with relay switches RL2–3 and RL3–3 in the line to the forward-run field coil of the motor ML is an overload relay coil OL and its normally closed switch OL–1 which is opened when the overload relay coil is energized due to the added load on the motor after the locknuts have been tightened. Also in series is a limit switch LS2 which is opened when the worm pinion 30 moves over on its shaft. The overload relay OL, when energized, also closes a switch OL–2 to light a signal lamp LP2 to indicate to the operator that the crosshead is locked in testing position. A limit switch LS3, operated to close when the limit switch LS2 is opened by the worm pinion 30, is in parallel with the overload switch OL–2 so as to light the lamp LP2 if the overload switch does not sooner operate.

The limt switches LS1, LS2 and LS3 are shown in FIGS. 3 and 4 as being mounted on suitable brackets on the crosshead where LS1 will be operated when the worm gear locknut 32 is backed off and where LS2 and LS3 will be operated when the worm pinion 30 moves over on its shaft.

In operation, starting from any locked position of the crosshead, the operator moves the direction selector switch Ss for the desired direction of movement, up or down, and pushes down start pushbutton PB1 to close switches S1 and S2. If the common hold relay and its lock-in switches shunting start switches S1 and S2 are not provided (not shown here), the pushbutton is held down until lamp LP1 is lighted.

The closing of S1 has no effect on the traversing motor because the switch RL1–2 in its starting circuit is open.

The closing of S2 completes the circuit to the locking motor ML to cause it to run in the reverse direction to back off the locknuts. Relay switch RL1–1 in the motor-run circuit is closed at this time.

When the locking motor has run for a sufficient time the back-off switch LS1 is closed to energize relay RL1 and light lamp LP1.

The energization of relay RL1 opens switch RL1–1 and stops the locking motor ML. It also closes switch RL1–2 in line with starting switch S1 and energizes whichever one of relays RL2 and RL3 is in line with the selector switch Ss.

The energization of relay RL2 or RL3 closes the respective switch RL2–2 or RL3–2 in the line to traversing motor MT and causes it to run in the selected direction, either to raise or lower the crosshead. It also energizes RL2–1 or RL3–1 to lock in the relay coil on the switch S3 of the stop pushbutton PB2. Starting switch pushbutton PB1 can now be released. Energization of RL–2 or RL–3 also opens switch RL2–3 or RL3–3 in the forward run circuit of locking motor ML so the locking motor cannot run until the traversing motor has stopped.

As stated above, the stop switch S3 and the relay switches RL2–1 and RL3–1 and the switch S4 can be eliminated if it is desired to have the operator hold down the pushbutton PB1 throughout the entire traversing period.

To stop, the operator pushes down the stop pushbutton PB2 to open switch S3 and close switch S4. The opening of switch S3 deenergizes whichever relay, RL2 or RL3, is active and stops the traversing motor MT. It will be assumed that the motor has a built-in brake which will stop it immediately without allowing any drift or overtravel.

Closing of switch S4 will start the locking motor ML into operation in forward or locking direction since both switches RL2–3 and RL3–3 are closed.

When the locknuts are tight the overload relay OL will open switch OL–1 and stop the motor; or if this fails the limit switch LS2 will open when the worm pinion 30 moves over to stop the locking motor.

Energization of overload relay OL will also close switch OL–2 to light lamp LP2 to indicate to the operator that the crosshead is locked and ready for testing operations to begin.

The limit switch LS3 in parallel with the relay switch OL–2 will light the lamp LP2 if the overload switch does not do so sooner.

It is thus seen that the invention provides a simple and dependable means for traversing the crosshead and for locking it securely in any desired position.

While one embodiment of the invention has been described for purposes of illustration it is to be understood that there may be various embodiments and modifications within the general scope of the invention.

What is claimed is:

1. Crosshead positioning means comprising in combination with screw columns and a travelling crosshead of a testing machine, traversing nuts threaded on the screw columns and turnably mounted at the crosshead for positioning the crosshead on the screw columns, locknuts threaded on the screw columns at the crosshead for locking the crosshead to the traversing nuts by turning on said screw columns relative to said traversing nuts, gearing and a traversing drive shaft operatively associated with the traversing nuts to turn them and thereby move the crosshead along said screw columns, gearing and a locknut drive shaft operatively associated with the locknuts to turn them to lock and unlock the crosshead on said screw columns, and drive means for operating said gearing and said locknut drive shaft to turn said locknuts to lock and unlock the crosshead when the traversing nuts are held in a fixed position.

2. Crosshead positioning means as set forth in claim 1, characterized by the fact that said drive means includes a differential drive provided between said traversing shaft and said locknut drive shaft, and independent drive means provided for operating the traversing drive shaft when the locknut drive shaft is held in stopped position.

3. Crosshead positioning means for a machine having a plurality of screw columns and a travelling crosshead thereon, comprising, traversing nuts with gears threaded on the screw columns and turnably mounted at the crosshead for positioning the crosshead on the screw columns, power drive means for turning said traversing nuts together in unison, locknuts with gears threaded on said screw columns at the crosshead for locking the crosshead to the traversing nuts, power drive means for turning said locknuts with gears relative to said traversing nuts into locking position when the crosshead has been moved into a desired position by said traversing nuts, and interconnecting drive means coupling said locknuts to said traversing nuts for turning said locknuts in unison with said traversing nuts.

4. Crosshead positioning means for a machine having a plurality of screw columns and a travelling crosshead thereon, comprising in combination, traversing nuts and locknuts on the columns at the crosshead, traversing nut driving shaft means acting through the traversing nuts for moving the crosshead up and down the columns, means for coupling said traversing nuts and locknuts for turning together and retaining the same axial position relative to each other when the locknuts are in an unlocked position, and locknut driving means cooperating with said means for coupling said traversing nuts and locknuts for locking and unlocking said locknuts by changing the relative axial position of said locknuts to said traversing nuts when the crosshead and said traversing nuts are in a fixed position.

5. Crosshead positioning means as set forth in claim 4, further characterized by the fact that said means for coupling said traversing nuts and locknuts is a differential drive unit provided with three drive connections comprising an input drive gear connected to the traversing nut driving means, an input drive gear connected to the locknut driving means and an output power drive gear connected to the locknut driving means.

6. Crosshead positioning means as set forth in claim 4, characterized by the fact that said traversing nut and said locknut driving means are independently operable for providing the traversing movement and the locking movement respectively, and said means for coupling said traversing nuts and said locknuts includes a differential drive unit with three drive connections respectively connected with the traversing nuts, with the locknuts, and with the locknut driving means.

7. Crosshead positioning means as set forth in claim 4, which further includes, locking switch means conditioning said locknut driving means for moving said locknuts into locking position after the crosshead movement has stopped, and back-off switch means conditioning said locknut driving means for moving said locknuts into unlocked position and conditioning said traversing nut driving means so that the crosshead traversing movement can be started.

8. Crosshead positioning means for a machine having a plurality of screw columns and a traversing crosshead thereon, comprising in combination, traversing nuts on the screw columns which carry the crosshead with them, locknuts on the columns movable at times with, and at times relative to, the traversing nuts to lock and unlock the crosshead on the screw columns, separate operating means for the traversing nuts and the locknuts, each of said operating means including a drive shaft and connecting gearing coupled to the nuts for turning the nuts, and a free-motion connection on one end of said locknut drive shaft coupling a locknut drive shaft gear and the locknut which allows the locknut drive shaft to turn after one of the locknuts has been locked and to fully tighten the other locknut.

9. Crosshead positioning means as set forth in claim 8, wherein said free-motion connection includes a sliding housing for said locknut drive shaft gear on the locknut drive shaft, providing a sliding gear meshing with the locknut on the screw column and further provided with a compressible spring for allowing movement of the sliding housing and said locknut drive shaft gear after the locknut has been locked.

10. Crosshead positioning means as set forth in claim 9, which further includes a drive stop means for the locknut driving means engageable by said sliding housing when the housing and gear has moved a predetermined distance along said locknut drive shaft.

11. Crosshead positioning means comprising in combination, a pair of laterally spaced non-rotatable screw columns, a crosshead mounted for axial movement on said columns, traversing nuts threaded on said screw columns and supporting the crosshead thereon, said traversing nuts having worm gears thereon, a traversing shaft having worm pinions meshing with said worm gears, a traversing motor connected to drive said traversing shaft, locknuts threaded on said screw columns above the crosshead for locking against said traversing nuts, said locknuts having worm gears thereon, a locknut shaft having worm pinions meshing with said worm gears, one of said lock shaft pinions having axial movement on its shaft and across its locked worm gear without turning it, a spring on the locknut shaft opposing the axial movement of said pinion, a three-shaft planetary differential gear unit having a first shaft connection with said traversing shaft, a second shaft connection with said locknut shaft, and a third shaft connection having a worm gear thereon, a locknut drive motor having a worm pinion meshing with the worm gear on said third differential shaft and forming a non-back-drive connection which causes the traversing motor to turn both the traversing shaft and the locknut shaft in unison when the locknut motor is stopped, means for starting said traversing motor, said starting means including means for first starting said locknut motor to operate in a direction to unlock the locknuts, means operated when the locknuts are in unlocked position for conditioning the traversing motor for operation, means operative when the traversing motor stops for starting said locknut motor in a direction to lock the locknuts, and means for stopping the locknut motor when the nuts have been locked.

12. Crosshead positioning means as set forth in claim 11, wherein said locknut motor stop means includes an overload switch and a safety switch operated by the sliding pinion on said locknut shaft.

13. Crosshead positioning means as set forth in claim 11, wherein said traversing motor drive conditioning means includes a switch which is actuated when the locknuts are backed off a predetermined distance.

References Cited in the file of this patent

UNITED STATES PATENTS

| | | |
|---|---|---|
| 1,788,071 | Strout | Jan. 6, 1931 |
| 2,185,096 | Treer | Dec. 26, 1939 |
| 2,291,106 | Ruch | July 28, 1942 |
| 2,786,360 | Cameron | Mar. 26, 1957 |

FOREIGN PATENTS

| | | |
|---|---|---|
| 1,055,360 | Germany | Apr. 16, 1959 |